(12) United States Patent
Okazaki

(10) Patent No.: US 11,314,505 B2
(45) Date of Patent: Apr. 26, 2022

(54) ARITHMETIC PROCESSING DEVICE

(71) Applicant: FUJITSU LIMITED, Kawasaki (JP)

(72) Inventor: Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/166,286

(22) Filed: Feb. 3, 2021

(65) Prior Publication Data
US 2021/0318868 A1    Oct. 14, 2021

(30) Foreign Application Priority Data

Apr. 8, 2020    (JP) .............................. JP2020-069952

(51) Int. Cl.
*G06F 9/30*    (2018.01)

(52) U.S. Cl.
CPC .......... *G06F 9/3001* (2013.01); *G06F 9/3013* (2013.01); *G06F 9/3016* (2013.01)

(58) Field of Classification Search
None
See application file for complete search history.

(56) References Cited

U.S. PATENT DOCUMENTS

| | | | | |
|---|---|---|---|---|
| 6,188,411 B1* | 2/2001 | Lai | ............................ | G06F 9/35 718/107 |
| 6,279,100 B1* | 8/2001 | Tremblay | ............ | G06F 9/30141 712/E9.046 |
| 7,574,583 B2* | 8/2009 | Leijten | ................. | G06F 9/30149 712/24 |
| 8,108,658 B2* | 1/2012 | Van Wel | ............... | G06F 9/3885 712/225 |
| 9,921,763 B1* | 3/2018 | Zitlaw | ........................ | G11C 7/22 |
| 2006/0026400 A1* | 2/2006 | Chauvel | .............. | G06F 12/0802 712/226 |
| 2010/0274991 A1* | 10/2010 | Duan | ................... | G06F 9/30101 712/E9.002 |
| 2011/0035745 A1* | 2/2011 | Li | ........................ | G06F 9/30174 718/1 |
| 2015/0019836 A1* | 1/2015 | Anderson | ............ | G06F 9/30036 712/3 |
| 2015/0227366 A1* | 8/2015 | Sudhakar | ............ | G06F 9/30145 712/208 |
| 2017/0140148 A1* | 5/2017 | Gleeson | ................... | G06F 21/57 |
| 2019/0339971 A1* | 11/2019 | Grocutt | ............... | G06F 9/30036 |

FOREIGN PATENT DOCUMENTS

JP    H05-012009 A    1/1993

* cited by examiner

*Primary Examiner* — Eric Coleman
(74) *Attorney, Agent, or Firm* — Fujitsu Patent Center

(57) ABSTRACT

An arithmetic processing device includes: a decoder configured to write an immediate value to a register in a case where an instruction to be executed is an instruction not involving data reading from the register; and a processor configured to read data from the register and write a computing result based on the read data to the register in a case where an instruction to be executed by the decoder is an instruction involving data reading from the register.

5 Claims, 6 Drawing Sheets

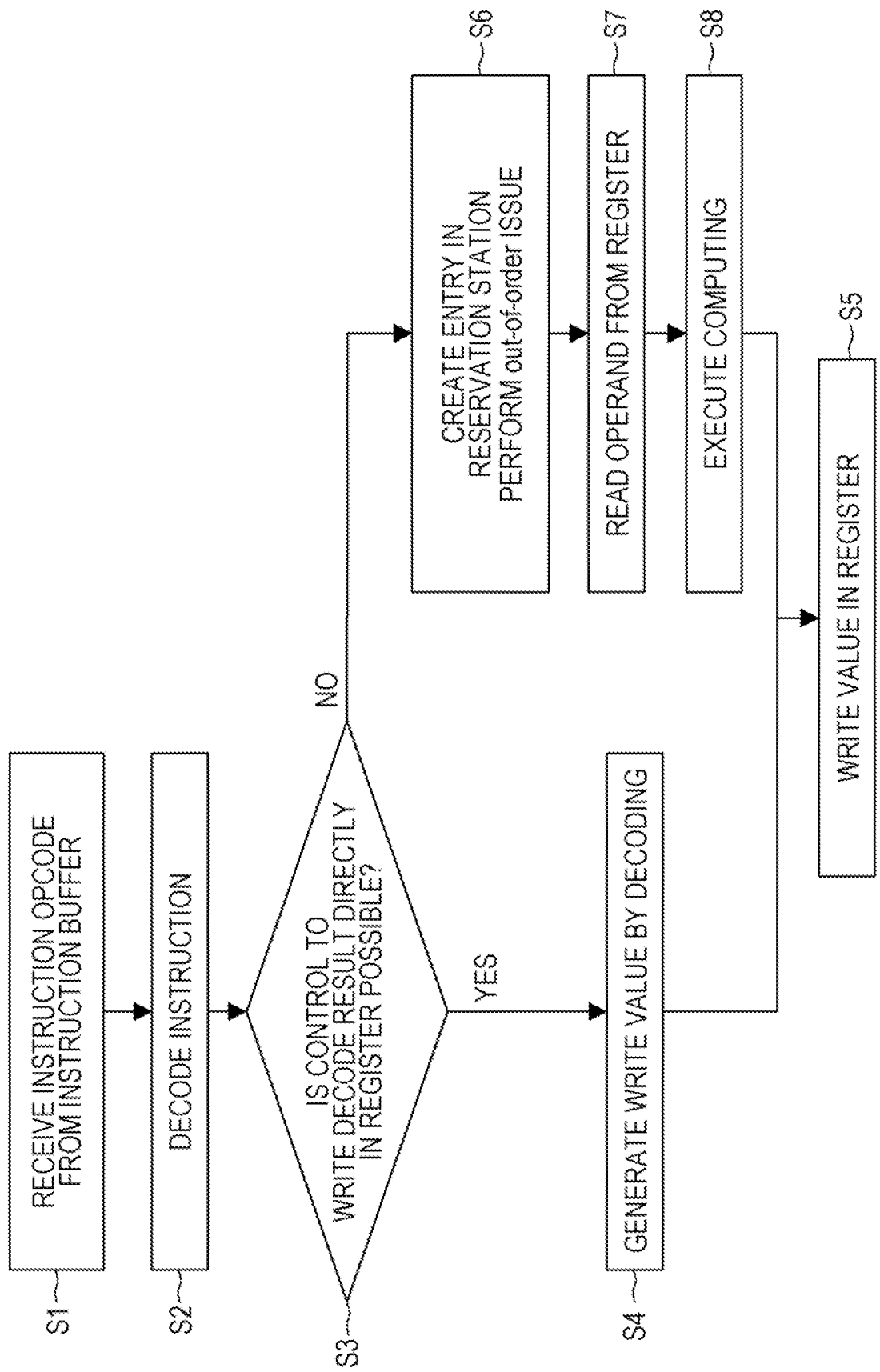

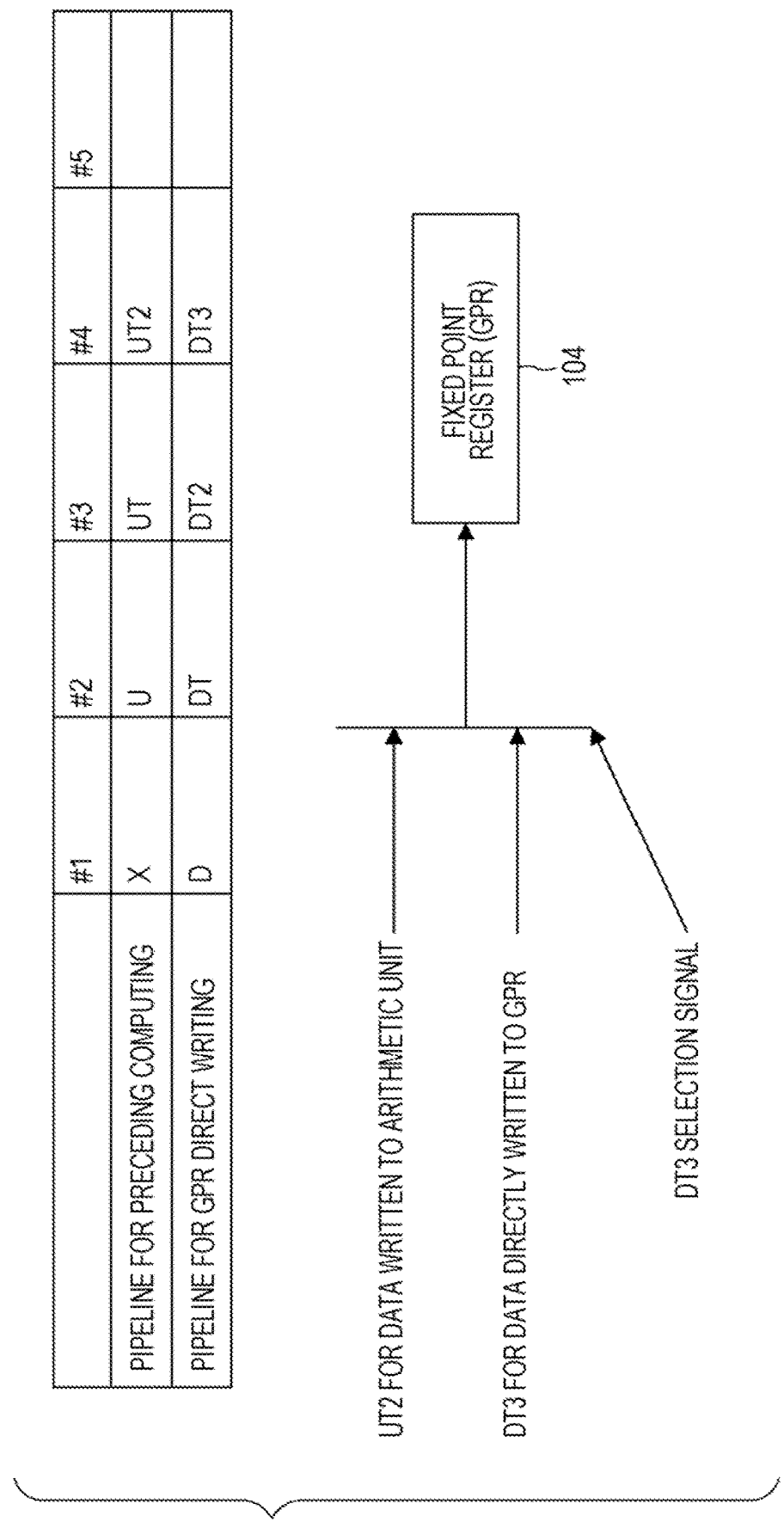

ARITHMETIC PROCESSING DEVICE

CROSS-REFERENCE TO RELATED APPLICATION

This application is based upon and claims the benefit of priority of the prior Japanese Patent Application No. 2020-69952, filed on Apr. 8, 2020, the entire contents of which are incorporated herein by reference.

FIELD

The embodiment discussed herein is related to an arithmetic processing device.

BACKGROUND

Even for an instruction that does not have to read a value in a register, a processor executes computing by reading the value in the register, and writes the result to the register, as is the case with an instruction that has to read a value in a register. For example, for an instruction "Mov x1, #1" to write an immediate value #1 to a register x1, the processor does not have to read data from a fixed-point register actually. However, since such an instruction takes the same path as another instruction, such as add, which involves reading from a register, a result of the instruction is written to the register via a pipeline for register reading and a pipeline of an arithmetic unit.

Japanese Laid-open Patent Publication No. 5-12009 is an example of the related art.

SUMMARY

According to an aspect of the embodiments, an arithmetic processing device includes: a decoder configured to write an immediate value to a register in a case where an instruction to be executed is an instruction not involving data reading from the register; and a processor configured to read data from the register and write a computing result based on the read data to the register in a case where an instruction to be executed by the decoder is an instruction involving data reading from the register.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart for explaining computing processing in the arithmetic processing device illustrated in FIG. 1; and FIG. 6 is a diagram for explaining determination of a write port in an arithmetic processing device as a modification example.

DESCRIPTION OF EMBODIMENTS

Figure 1:
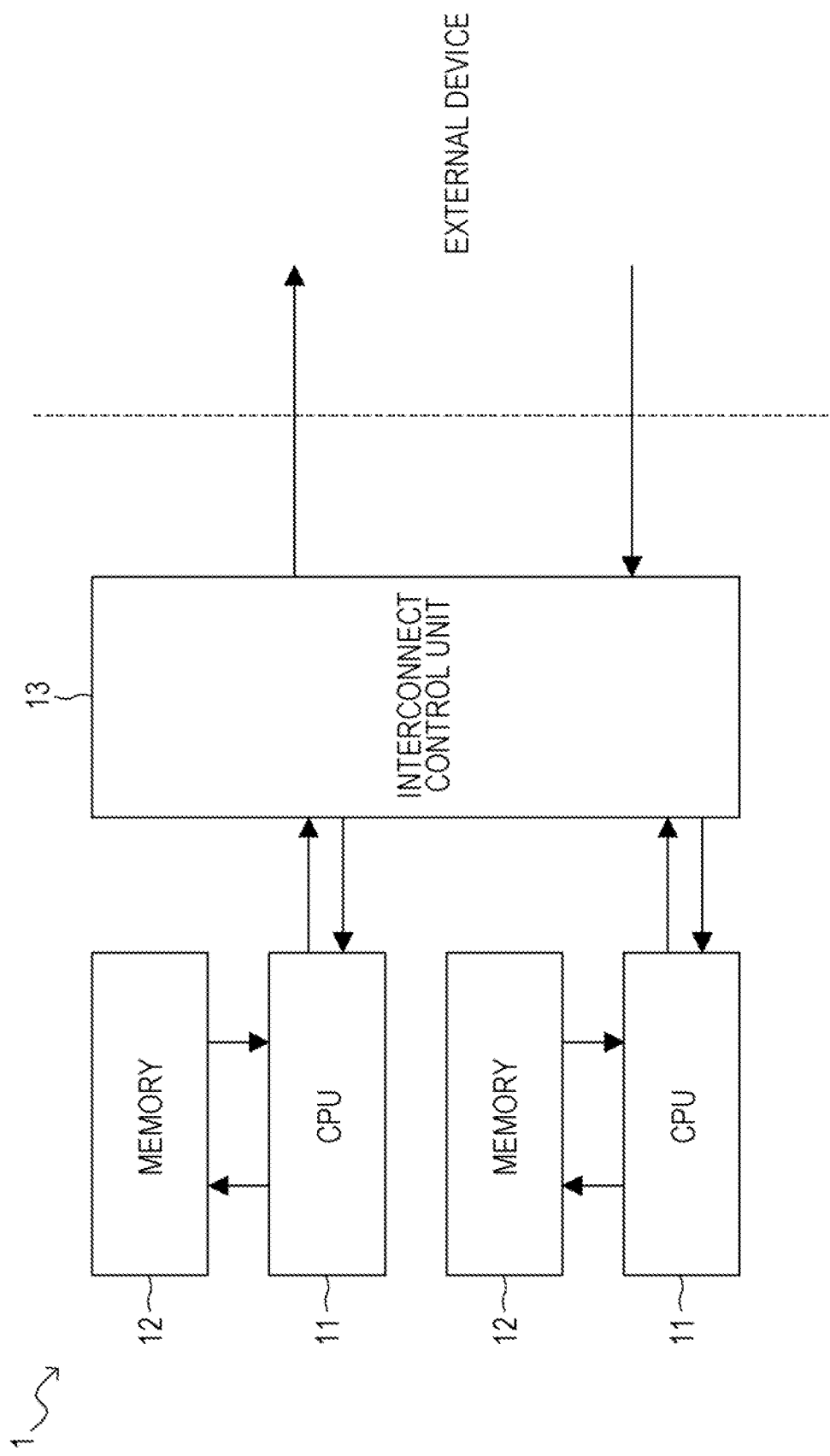
FIG. 1 is a block diagram schematically illustrating a hardware configuration example of an arithmetic processing device according to an example of an embodiment.

When an arithmetic processing device is equipped with only a small number of arithmetic units, instructions per clock (IPC) may not be increased because the arithmetic units are a bottleneck. On the other hand, when the number of arithmetic units is increased, there is a problem that a penalty increases from the viewpoint of a circuit amount.

In one aspect, a processing speed of a processor may be improved.

Hereinafter, an embodiment will be described with reference to the drawings. Note that, the following embodiment is merely an example and is not intended to exclude various modification examples and technical applications which are not explicitly described in the embodiment. For example, the present embodiment may be implemented with various modifications without departing from the gist of the present embodiment.

The drawings are not intended to indicate that only the drawn elements are provided, but the embodiment may include other functions and so on.

Since the same reference signs indicate the same components in the drawings, duplicate description thereof will be omitted below.

[A] Example of Embodiment

[A-1] Example of System Configuration

FIG. 1 is a block diagram schematically illustrating a hardware configuration example of an arithmetic processing device 1 according to an example of an embodiment.

The arithmetic processing device 1 includes plural (two in the illustrated example) central processing units (CPUs) 11, plural (two in the illustrated example) memories 12, and an interconnect control unit 13.

The memory 12 is exemplarily a memory device including a read-only memory (ROM) and a random-access memory (RAM). Programs such as a basic input/output system (BIOS) may be written to the ROM of the memory 12. The software programs in the memory 12 may be loaded and executed by the CPU 11 as appropriate. The RAM of the memory 12 may be used as a primary recording memory or a working memory.

The interconnect control unit 13 is an interface for enabling communications with an external device.

The CPU 11 exemplarily controls operations of the entire arithmetic processing device 1. A device for controlling the operations of the entire arithmetic processing device 1 is not limited to the CPU 11, but may be any one of, for example, an MPU, a DSP, an ASIC, a PLD, and an FPGA. The device for controlling the operations of the entire arithmetic processing device 1 may be a combination of two or more of a CPU, an MPU, a DSP, an ASIC, a PLD, and an FPGA. MPU is an abbreviation for a microprocessor unit, DSP is an abbreviation for a digital signal processor, and ASIC is an abbreviation for an application-specific integrated circuit. PLD is an abbreviation for a programmable logic device, and FPGA is an abbreviation for a field-programmable gate array.

Figure 2:
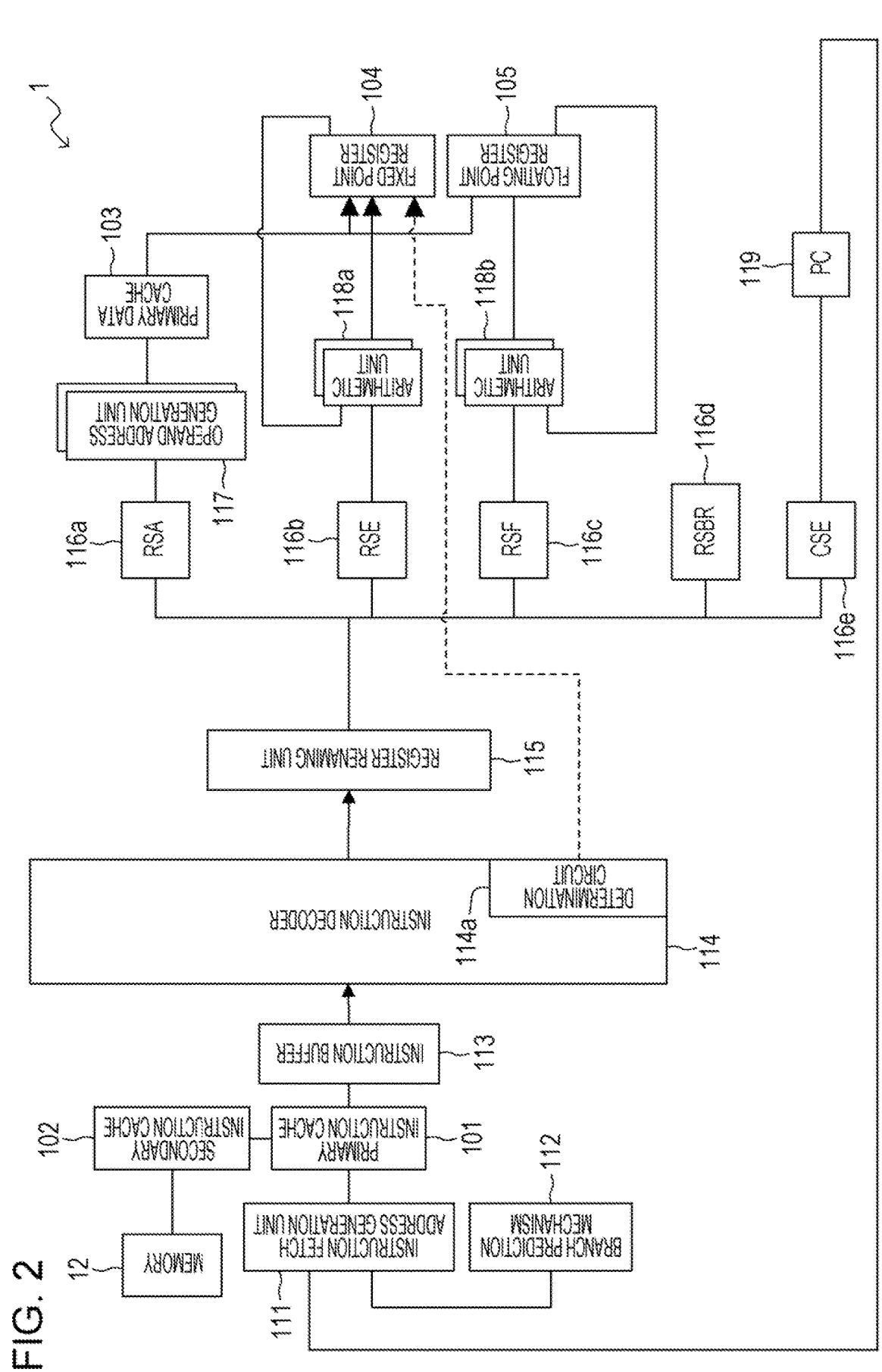
FIG. 2 is a block diagram schematically illustrating a software configuration example of the arithmetic processing device illustrated in FIG. 1.

FIG. 2 is a block diagram schematically illustrating a software configuration example of the arithmetic processing device 1 illustrated in FIG. 1.

As illustrated in FIG. 2, the CPU 11 functions as an instruction fetch address generator 111, a branch prediction mechanism 112, an instruction buffer 113, an instruction decoder 114, and a register renaming unit 115. The CPU 11 also functions as an RSA 116a, an RSE 116b, an RSF 116c, an RSBR 116d, a CSE 116e, an operand address generator 117, arithmetic units 118a and 118b, and a PC 119. The CPU 11 further functions as a primary instruction cache 101, a secondary instruction cache 102, a primary data cache 103, a fixed-point register 104, and a floating-point register 105.

Here, RSA is an abbreviation for a reservation station for address generation, RSE is an abbreviation for a reservation station for execution, and RSF is an abbreviation for a reservation station for floating point. RSBR is an abbreviation for a reservation station for branch, CSE is an abbreviation for a commit stack entry, and PC is an abbreviation for a program counter. The fixed-point register may be denoted as a general purpose register (GPR), and the floating-point register may be denoted as a FPR.

The instruction fetch address generator 111 generates an instruction fetch address and stores the instruction fetch address in the primary instruction cache 101, the secondary instruction cache 102, or the memory 12.

The branch prediction mechanism 112 predicts a branch in an instruction string to be executed in future.

The instruction buffer 113 temporarily stores instructions fetched from the primary instruction cache 101 in their original order in a program.

The instruction decoder 114 decodes the instructions temporarily stored in the instruction buffer 113. The instruction decoder 114 includes a determination circuit 114a for determining whether direct writing to the fixed-point register 104 by an instruction is possible.

The register renaming unit 115 determines a physical register to which a computing result is to be written. In FIG. 2, the number of processes executed in parallel is 1 for the sake of simplicity. The number of processes executed in parallel may be increased by using a superscalar processor. The register renaming unit 115 may use a physical register map method or an update-buffer method.

Each of the RSA 116a, the RSE 116b, the RSF 116c, and the RSBR 116d is a storage with a queue structure called a reservation station. When the register renaming unit 115 determines the physical register to which a computing result is to be written, the corresponding instruction is accumulated in the reservation station.

The RSA 116a is a reservation station for address calculation of a load-store instruction, and is coupled to the operand address generator 117, the primary data cache 103, and the floating-point register 105 in the subsequent stage.

The RSE 116b is a reservation station for fixed-point calculation, and is coupled to the arithmetic unit 118a and the fixed-point register 104 in the subsequent stage.

The RSF 116c is a reservation station for floating-point calculation, and is coupled to the arithmetic unit 118b and the floating-point register 105 in the subsequent stage.

The RSBR 116d is a reservation station for a branch instruction.

The instructions decoded by the instruction decoder 114 are assigned instruction identifications (IID) in their original order, and are sent in their original order to a circuit called the CSE 116e that performs a COMMIT process. The CSE 116e is divided into a storage with a queue structure in which decoded instructions are stored in an execution order of the instructions, and a completion processing circuit that performs the COMMIT process based on queue information and a completion report from each processing pipeline. The instructions decoded by the decoder are stored in a queue of the CSE 116e, and each wait for a completion report of instruction processing. A completion report of each of the instructions executed in out-of-order in the reservation stations is sent to the CSE 116e. Among the instructions which are stored in the queue while waiting for the completion reports, the instructions corresponding to the respective completion reports are terminated (committed) in their original execution order in the program by the completion processing circuit of the CSE 116, and thereby the resources are updated.

The PC 119 is coupled as a subsequent stage to the CSE 116e and coupled as a previous stage to the instruction fetch address generator 111, and notifies the instruction fetch address generator 111 of an address in the memory 12 where an instruction to be executed next is stored, based on a computing result of the CSE 116e.

A sequence of processing in the fixed-point register 104 in a physical register map method will be described below.

In the physical register map method, a renaming map table on a decode-cycle basis is prepared, and update is performed on the decode-cycle basis. If the fixed-point register 104 includes 32 registers, the renaming map table has physical register numbers to be allocated to the 32 registers and a flag indicating whether a read-after-write order relation of each register is resolved. The flag may be referred to as a read interlock (RI), and an RI of "1" indicates that the read-after-write order relation has not been resolved yet.

Computing is performed when reading data from the fixed-point register 104.

Figure 3:
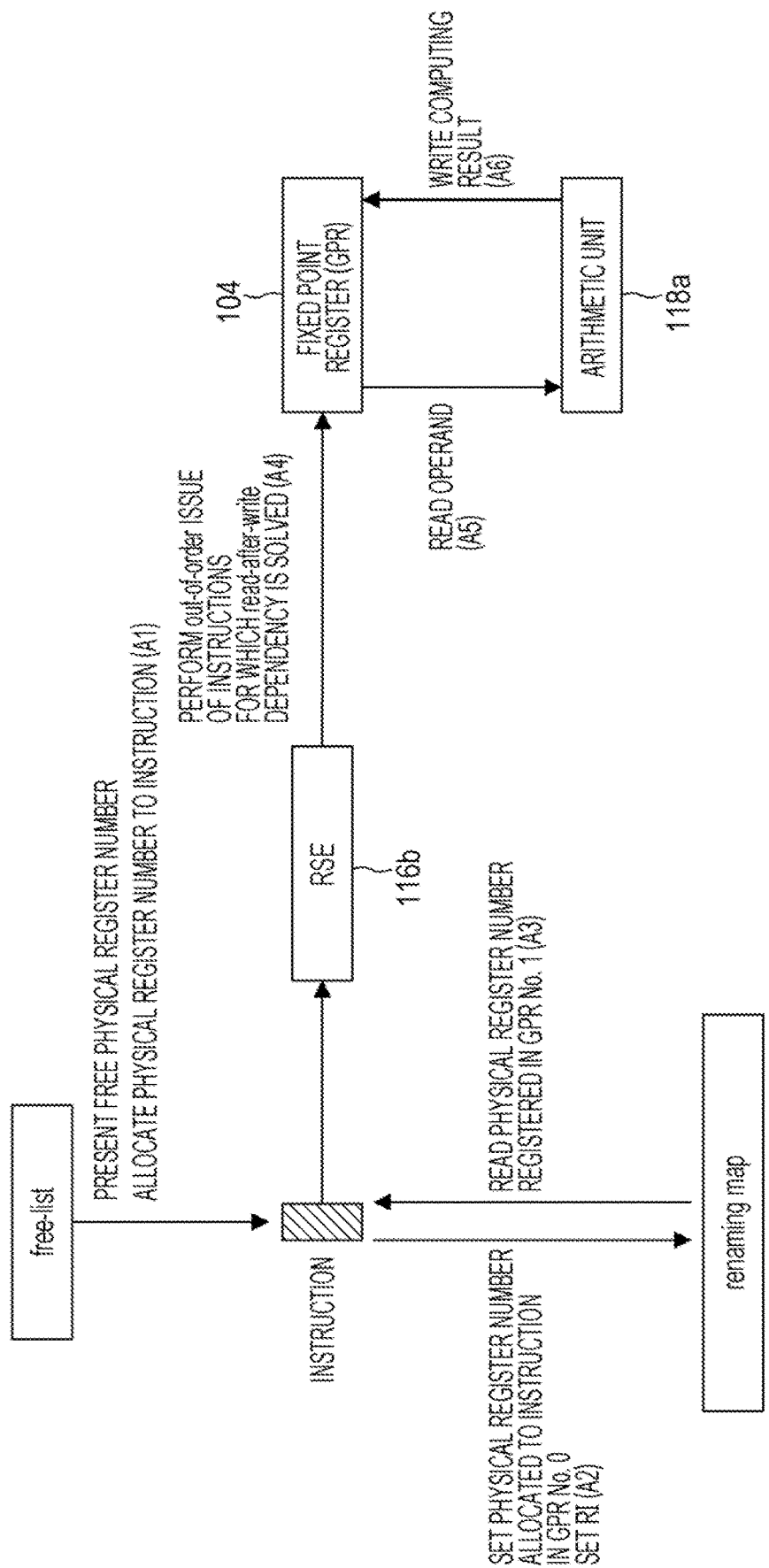
FIG. 3 is a block diagram illustrating reading and writing processing on a fixed-point register in the arithmetic processing device illustrated in FIG. 1.

FIG. 3 is a block diagram for explaining reading and writing processing on the fixed-point register 104 in the arithmetic processing device 1 illustrated in FIG. 1.

For an instruction to write to the fixed-point register 104, the following processing is performed.

Here, assumed is an instruction to execute computing using information in a register GPR No. 1 and write the result to a register GPR No. 0. For example, if the instruction is "Add x0, x1, #1", an immediate value of #1 is added to the value in x1 (GPR No. 1) and the obtained value is written to x0 (GPR No. 0).

First, the register renaming unit 115 determines a physical register to which the computing result is to be written. As indicated by reference sign A1, physical register numbers are sequentially read from a list called "free-list" in which the numbers of free physical registers are stored. The sequentially-read physical register numbers are sequentially allocated to GPR write instructions in the slots.

As indicated by reference sign A2, when the physical register number as the write target is determined, the physical register number allocated to the write target register GPR No. 0 is registered and the RI is set in the renaming map table.

As indicated by reference sign A3, in a case where multiple instructions in the same slot involve writing to the GPR No. 0 in parallel processing by a superscalar, the last instruction is selected. At the same time, the physical register number and the RI stored for the GPR number (GPR No. 1) to be used in computing of the concerned instruction are read.

If the RI is set, the read-after-write order dependency for the number has not been resolved. As indicated by reference sign A4, each instruction creates an entry in the RSE 116b, and is issued from the RSE 116b in out-of-order when the read-after-write order relation for the instruction is resolved. Since the physical register number to be used for computing of the issued instruction is already read as described above, the computing is performed by reading information from the fixed-point register 104 by using the physical register number. Since the physical register number to which the computing result is to be written is determined by the register renaming unit 115, the computing result is written to that number.

As indicated by reference sign A5, for an instruction that does not have to read from the fixed-point register 104, an immediate value is used as an operand without doing anything in the sequence for reading from the fixed-point register 104.

Then, as indicated by reference sign A6, the computing is performed and the computing result is written to the fixed-point register 104.

Figure 4:
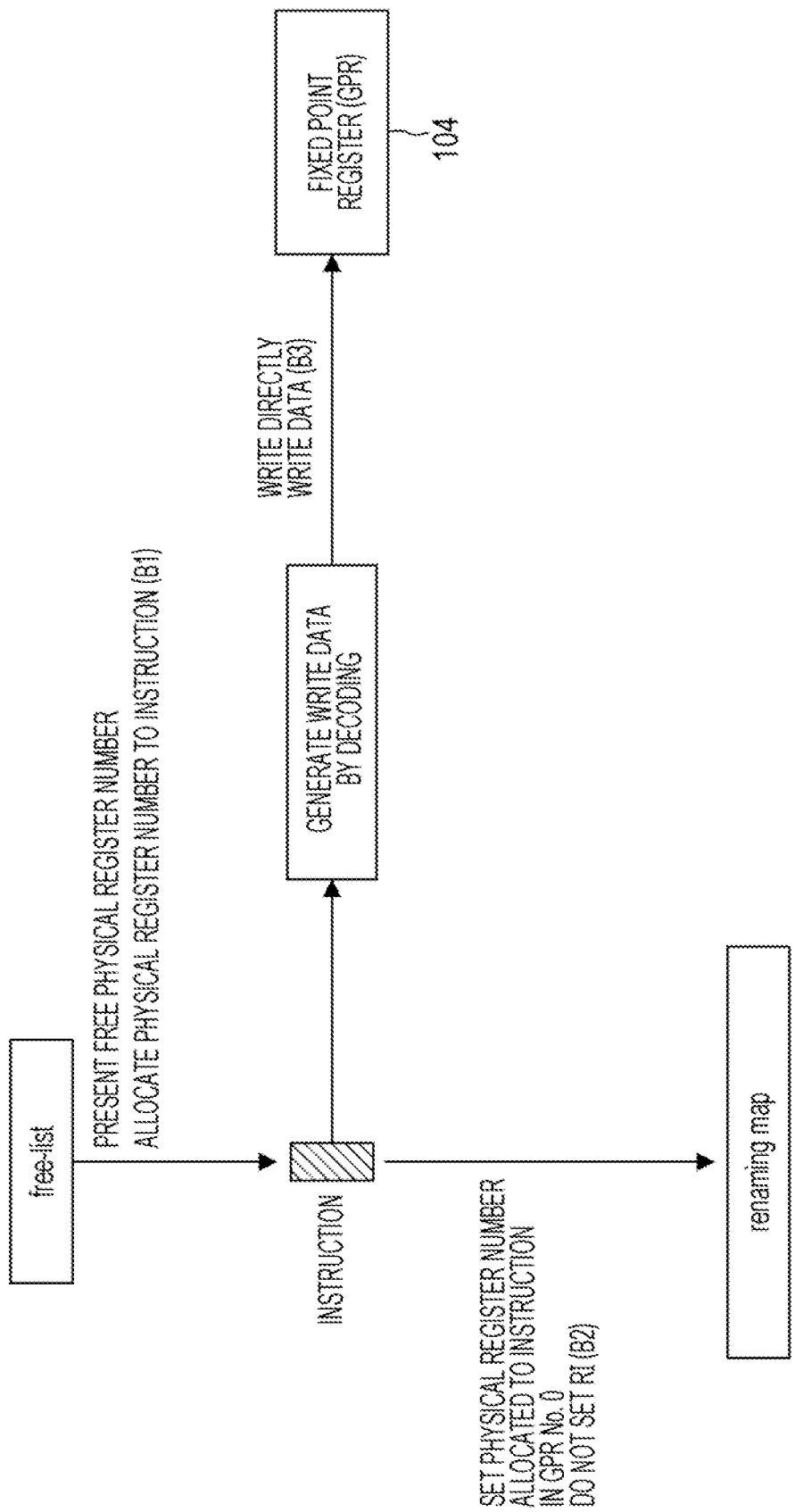
FIG. 4 is a block diagram illustrating writing processing on the fixed-point register in the arithmetic processing device illustrated in FIG. 1.

FIG. 4 is a block diagram for explaining writing processing on the fixed-point register 104 in the arithmetic processing device 1 illustrated in FIG. 1.

In an example illustrated in FIG. 4, processing executed for an instruction that does not have to read from the fixed-point register 104 is different from the processing illustrated in FIG. 3. Whether reading from the fixed-point register 104 has to be done is determined by, for example, decoding an instruction opcode. To this end, the instruction decoder 114 includes the determination circuit 114a (see FIG. 2) that determines whether direct writing to the fixed-point register 104 is possible. If it is determined that direct writing is possible, an operation of directly writing to the fixed-point register 104 is performed.

As indicated by reference sign B1, also for an instruction which does not have to read from the fixed-point register 104, the same processing illustrated in FIG. 3 is executed to fetch a free physical register number from the free-list.

As indicated by reference sign B2, the physical register number is set but the RI is not set in the renaming map. Since reading from the fixed-point register 104 is unnecessary, the physical register number does not have to be acquired from the renaming map. Furthermore, an entry does not have to be created in the fixed-point register 104. Since the RI is not set, a subsequent instruction that involves reading from that register may be executed without waiting for an issuance of the instruction that does not have to read from the fixed-point register 104. Thus, the substantial latency is hidden and the computing is seen as having 0 τ.

In this way, the latency is substantially reduced for an instruction that does not have to read a register file, and a subsequent operation using the computing result may be quickly executed. As a result, the program may be processed at high speed.

For an instruction to write an immediate value, for example, information to be directly written to the fixed-point register 104 as indicated by reference sign B3 may be generated based on an instruction opcode. For example, "Mov x0, #1" is to write an immediate value of "1" to x0 (GPR No. 0). Alternatively, for an instruction to write an immediate value of its own PC 119 or PC+, write data may be generated by decoding from an instruction opcode and the own PC 119. If the write timing is later than the timing at which a subsequent instruction performs reading from the fixed-point register 104, the subsequent instruction fails to read the correct information. Thus, the write timing is set to be earlier than the timing at which the subsequent instruction performs reading from the fixed-point register 104.

The processing of directly writing data to the fixed-point register 104 has been described with reference to FIG. 4. Here, processing of directly writing data to the floating-point register 105 may be executed in the same way.

For example, in a case where an instruction to be executed is an immediate instruction (for example, an immediate instruction or an immediate operand) that does not involve data reading from the register, the instruction decoder 114 writes the immediate value to the register. In a case where an instruction to be executed by the instruction decoder 114 is an instruction that involves data reading from the register, the arithmetic unit 118a or 118b reads the data from the register, and writes the computing result based on the read data to the register.

The instruction decoder 114 writes the immediate value to the register via a dedicated port in the register.

[A-2] Operation Example

The computing processing in the arithmetic processing device 1 illustrated in FIG. 1 will be described with reference to a flowchart (steps S1 to S8) illustrated in FIG. 5.

The instruction decoder 114 receives an instruction opcode from the instruction buffer 113 (step S1).

The instruction decoder 114 decodes the instruction (step S2).

The determination circuit 114a determines whether or not control for directly writing the decoding result to the register is possible (step S3).

If the control for directly writing the decoding result to the register is possible (see a YES route from step S3), the instruction decoder 114 generates a write value by decoding (step S4).

The instruction decoder 114 writes the value to the register (step S5). Then, the computing processing in the arithmetic processing device 1 ends.

On the other hand, if the control for directly writing the decoding result to the register is not possible (see a NO route from step S3), the instruction decoder 114 creates an entry in the reservation station, and the reservation station issues the instruction to the register in out-of-order (step S6).

The arithmetic unit 118a or 118b reads the operand from the register (step S7).

The arithmetic unit 118a or 118b executes computing (step S8).

The arithmetic unit 118a or 118b writes the value of the computing result to the register (step S5), and the computing processing in the arithmetic processing device 1 ends.

[A-3] Effects

With the arithmetic processing device 1 in the example of the embodiment described above, for example, the following effects may be obtained.

In a case where an instruction to be executed is an immediate instruction (for example, an immediate instruction or an immediate operand) that does not involve data reading from a register, the instruction decoder 114 writes the immediate value to the register. In a case where an instruction to be executed by the instruction decoder 114 is an instruction that involves data reading from the register, the arithmetic unit 118a or 118b reads the data from the register, and writes the computing result based on the read data to the register.

In this way, for an instruction that does not have to read data from a register, data is directly output to a register. As a result, the processing speed of the processor may be improved. Thus, computing for an instruction that does not use a value in a register as an input is controlled without using the arithmetic unit 118a or 118b, so that the busy rate of the arithmetic unit 118a or 118b may be reduced. Since an instruction that does not use a value in a register as an input is executed with a substantial latency of 0 τ, it is possible to suppress a decrease in the IPC in a configuration where the CPUs 11 are coupled together in a daisy chain manner.

[A-4] Modification Example

In the example of the embodiment described above, the fixed-point register 104 includes the dedicated port for writing from the instruction decoder 114. In the present modification example, writing to the fixed-point register 104 is enabled without additionally providing the fixed-point register 104 with a dedicated port for writing from the instruction decoder 114.

Here, assumed is an instruction that does not have to read from the fixed-point register 104 in a cycle of register renaming. For such an instruction, whether a write port of the fixed-point register 104 is available or not is determined at the timing for writing to the fixed-point register 104 without using the RSE 116b as in the processing described in the above embodiment.

The sequence of writing to the fixed-point register 104 without using the RSE 116b may be performed with a fixed number of cycles. When writing to the fixed-point register 104 is performed in the processing illustrated in FIG. 3, the latency of the computing is fixed. For this reason, in a cycle earlier by multiple cycles, it is possible to determine whether writing to the fixed-point register 104 will be performed after a fixed number of cycles.

The determination circuit 114a that is included in the instruction decoder 114 and determines whether direct writing is possible determines whether writing is possible by receiving information on the availability of a port for writing to the fixed-point register 104, in addition to determining whether direct writing is possible based on the instruction opcode.

For example, it is assumed that D is a cycle for instruction decoding and an instruction is written to the fixed-point register 104 in a DT3 cycle in a pipeline including D, DT, DT2, and DT3. It is also assumed that X is a cycle for computing and data is written to the GPR in UT2 in a pipeline including X, U, UT, and UT2. In this case, by viewing the two pipelines placed one on top of the other as illustrated in FIG. 6, it is understood that whether the port is available at the time of writing in the DT3 cycle is determinable by checking whether there is an instruction on any preceding computing, the X cycle of which coincides with the D cycle of the instruction for direct writing to the fixed-point register 104. The determination circuit 114a receives (X_VALID) indicating that the valid instruction exists in the X cycle, and makes the determination based on (X_VALID).

When the port is available, the processing as described above in the embodiment is performed by using the available write port. When the port is not available, the processing via the RSE 116b and the arithmetic unit 118a is performed in the same manner as an instruction that involves reading from the fixed-point register 104.

When it is determined that the port is available, the determination result may be propagated to the DT3 and used to select the write port for the DT3. When the writing in the DT3 is valid, no valid instruction exists in the UT2. Thus, instead of selecting the UT2 side, the data for the DT3 may be selected and written to the fixed-point register 104.

For example, when an instruction to be executed is an instruction that does not involve data reading from the register and the register has an available port, the instruction decoder 114 writes the immediate value to the register. When an instruction to be executed by the instruction decoder 114 is an instruction that involves data reading from the register or when the register has no available port, the arithmetic unit 118a or 118b reads the data from the register. Then, the arithmetic unit 118a or 118b writes the computing result based on the read data to the register.

In this way, the processing of writing the computing result to the register may be implemented as in the above-described embodiment without adding the write port.

[B] Others

The disclosed technique is not limited to the above-described embodiment but may be carried out with various modifications without departing from the gist of the present embodiment. Each configuration and each process of the present embodiment may be selected as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a processor configured to execute a computing; and
a decoder configured to decode an instruction to be executed, determine whether the instruction to be executed is an instruction which does not involve data reading from a register and write an immediate value to a register without using the processor when determining that the instruction to be executed is the instruction which does not involve the data reading from the register,
the processor is configured to read data from the register and write a computing result based on the read data to the register when determining, by the decoder, that the instruction to be executed is an instruction which involves the data reading from the register.

2. The arithmetic processing device according to claim 1, wherein the register is a fixed-point register.

3. The arithmetic processing device according to claim 1, wherein the register is a floating-point register.

4. The arithmetic processing device according to claim 1, wherein the decoder writes the immediate value to the register via a dedicated port of the register.

5. The arithmetic processing device according to claim 1, wherein the decoder writes the immediate value to the register in a case where the instruction to be executed is an instruction which does not involve the data reading from the register and where the register has an available port, and the processor reads data from the register and writes a computing result based on the read data to the register in a case where the instruction to be executed by the decoder is an instruction which involves the data reading from the register or where the register has no available port.

* * * * *